US011245295B2

(12) United States Patent
Liu et al.

(10) Patent No.: US 11,245,295 B2
(45) Date of Patent: Feb. 8, 2022

(54) ROTOR

(71) Applicant: Delta Electronics, Inc., Taoyuan (TW)

(72) Inventors: Yu-Hsiang Liu, Taoyuan (TW);
Ta-Chien Yeh, Taoyuan (TW);
Hsiang-Yun Hsiao, Taoyuan (TW);
Chia-Hsiang Yang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 31 days.

(21) Appl. No.: 16/983,930

(22) Filed: Aug. 3, 2020

(65) Prior Publication Data
US 2021/0296949 A1 Sep. 23, 2021

(30) Foreign Application Priority Data
Mar. 17, 2020 (CN) .......................... 202020336318.8

(51) Int. Cl.
H02K 1/27 (2006.01)
(52) U.S. Cl.
CPC .................................. H02K 1/276 (2013.01)
(58) Field of Classification Search
CPC ... H02K 1/276; H02K 1/2766; H02K 2213/03
See application file for complete search history.

(56) References Cited

U.S. PATENT DOCUMENTS

2016/0006307 A1* 1/2016 Yokota .................. H02K 1/2766
310/59

* cited by examiner

Primary Examiner — Thomas Truong
(74) Attorney, Agent, or Firm — Kirton McConkie; Evan R. Witt

(57) ABSTRACT

A rotor is provided. The rotor includes a main body, a plurality of magnets and a plurality of magnet-receiving slots. The plurality of magnet-receiving slots are disposed on the main body and disposed around a central axis. Each two adjacent magnet-receiving slots are symmetrical to each other. Each magnet-receiving slot includes a slot body and a first flux barrier connected with each other. Each magnet is contained in the corresponding slot body. Each first flux barriers includes a respective arc-cutting start point. A minimum arc-cutting distance is formed between the two respective arc-cutting start points. Each of the two respective arc-cutting start points is extended toward the central axis along an arc with a first arc length radius to define a first arc-cutting end point. The first arc length radius is greater than or equal to 0.2 times of the minimum arc-cutting distance.

7 Claims, 4 Drawing Sheets

ROTOR

CROSS-REFERENCE TO RELATED APPLICATION

This application claims priority to China Patent Application No. 202020336318.8 filed on Mar. 17, 2020. The entire contents of the above-mentioned patent application are incorporated herein by reference for all purposes.

FIELD OF THE INVENTION

The present disclosure relates to a rotor, and more particularly to a rotor with high structural strength.

BACKGROUND OF THE INVENTION

Generally, a permanent magnet electric machine or a permanent magnet motor includes a rotor and a stator. The stator includes a winding disposed thereon. The rotor includes a permanent magnet disposed thereon. The rotor is rotated by the magnetic force generated between the stator and the rotor.

Mostly, a flower-petal-shaped rotor design is exploited in a conventional permanent magnet motor, which has a plurality of slots. The plurality of slots are disposed around the outer periphery of the rotor to organize the magnetic flux, so as to achieve the effects of improving the motor torque or reducing the cogging torque. The rotor includes a plurality of ribs, and each of the ribs is disposed between two adjacent slots. The width of the rib directly affects stress concentration occurred in the rotor. When the permanent magnet motor is operated at high speed, for example the rotating speed of the permanent magnet motor is 15000 rpm, centrifugal force generated by the rotor increases the stress concentration in the rotor so that the increased stress concentration weakens the structural strength of the rotor. The anti-centrifugal force and the structural strength of the rotor are increased with the width of the rib. Thus, the design of the structure of the rib can resist the centrifugal force of the rotor which is operated at high rotating speed. Therefore, the stress concentration in the rotor is decreased and the structural strength of the rotor is enhanced. However, the magnetic loop characteristic of the permanent magnet motor is decreased while the structure of the rib is designed so that the efficacy of the motor is decreased.

Therefore, there is a need of providing an improved rotor so as to address the issues encountered by the prior arts.

SUMMARY OF THE INVENTION

An object of the present disclosure provides a rotor having advantages of enhancing the structural strength, the magnetic loop characteristic and the efficacy of a motor so as to optimize the characteristic of the motor.

In accordance with an aspect of the present disclosure, a rotor of a motor is provided. The rotor is matched with a stator of the motor. The rotor includes a main body, a plurality of magnets and a plurality of magnet-receiving slots. The main body includes a central axis. The plurality of magnet-receiving slots are disposed on the main body and disposed around the central axis. Each two adjacent magnet-receiving slots of the plurality of magnet-receiving slots are symmetrical to each other. Each of the plurality of magnet-receiving slots includes a slot body and a first flux barrier. The slot body is connected with the first flux barrier and contains the corresponding magnet therein. In each two of the plurality of magnet-receiving slots which are adjacent and symmetrical to each other, each first flux barrier of each two of the plurality of magnet-receiving slots includes a respective arc-cutting start point. A minimum arc-cutting distance is formed between the two respective arc-cutting start points. Each of the two respective arc-cutting start points is extended toward the central axis along an arc with a first arc length radius to define a first arc-cutting end point. The first arc length radius is greater than or equal to 0.2 times of the minimum arc-cutting distance.

In accordance with an aspect of the present disclosure, a rotor is provided. The first arc length radius is greater than or equal to 0.2 times of the minimum arc-cutting distance. Consequently, the value of dividing the first arc length radius by the minimum arc-cutting distance is larger, and the stress concentration factor is decreased. The structural strength of the rotor of the present disclosure is enhanced. Moreover, when the value of dividing the first arc length radius by the minimum arc-cutting distance is larger, the structural strength of the rotor is higher. Consequently, when the structural strength of the rotor is maintained and the first arc length radius is increased, the minimum arc-cutting distance is decreased moderately and accordingly. Therefore, the width of the rib can be decreased. Consequently, the structural strength of the rotor of the present disclosure is enhanced, and the magnetic loop characteristic and the efficacy of the motor using the rotor are enhanced. The whole characteristic of the motor using the rotor is optimized.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
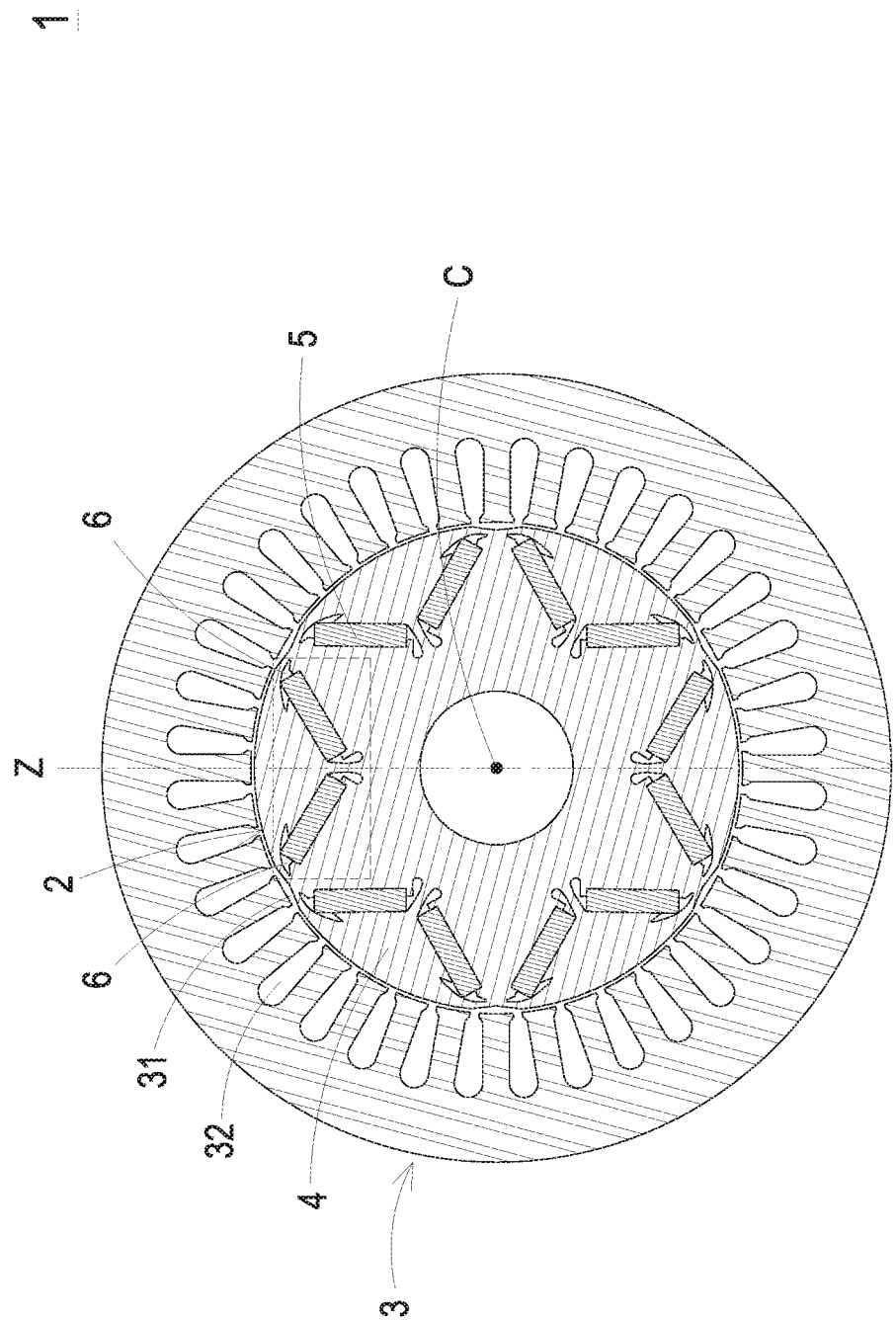
FIG. 1 is a schematic perspective view illustrating a rotor applied to a motor according to an embodiment of the present disclosure.
Figure 2A:
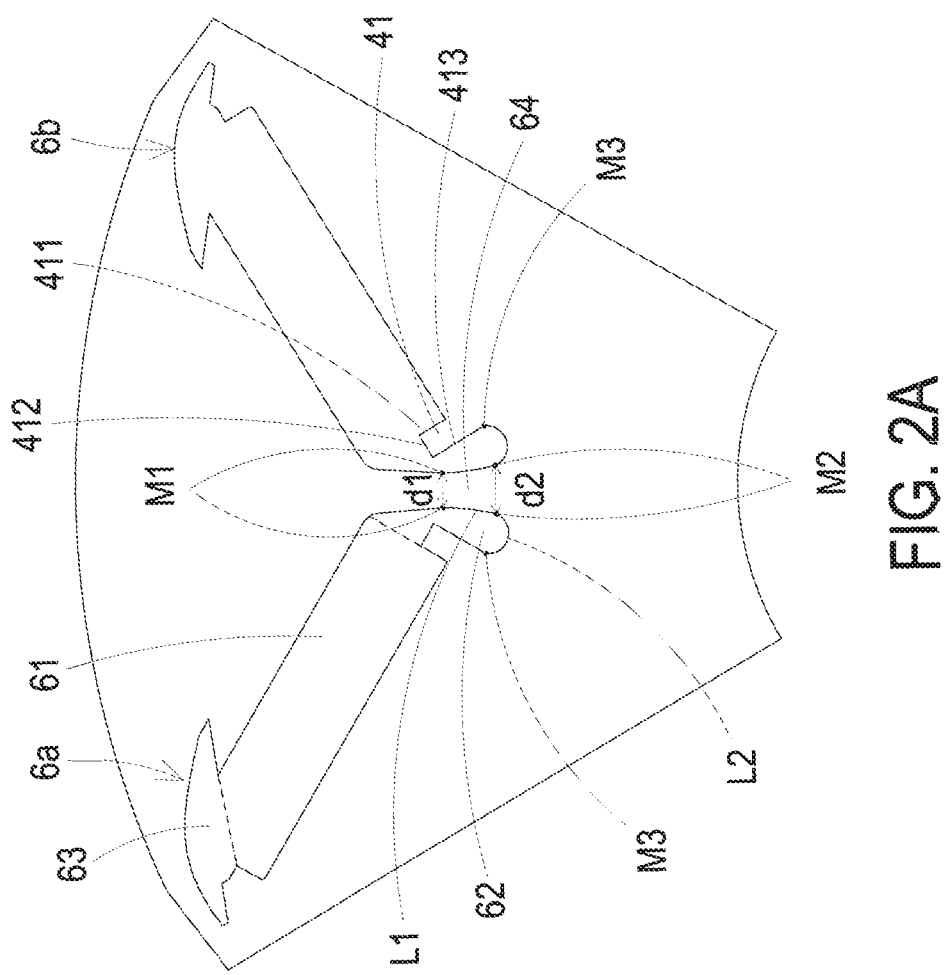
FIGS. 2A and 2B are partial schematic perspective views illustrating the rotor of FIG. 1.
Figure 2B:
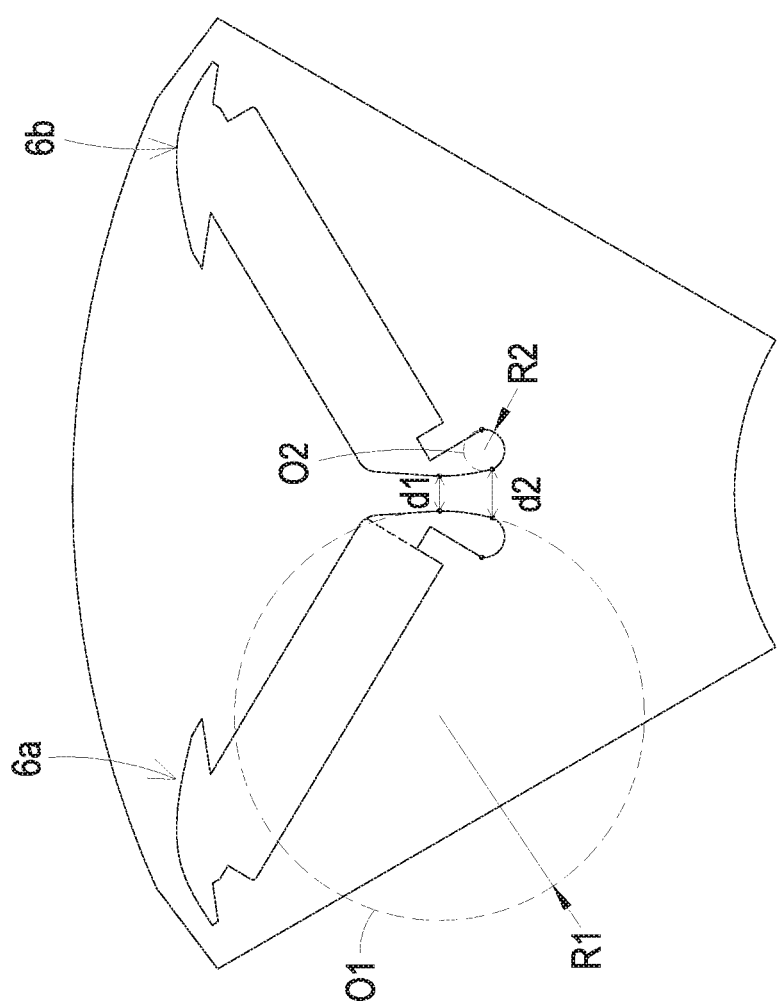

FIG. 1 is a schematic perspective view illustrating a rotor applied to a motor according to an embodiment of the present disclosure. FIGS. 2A and 2B are partial schematic perspective views illustrating the rotor of FIG. 1. As shown in FIGS. 1, 2A and 2B, a motor 1 is provided. The motor 1 includes a rotor 2 and a stator 3 matched with each other. Preferably but not exclusively, the combination of the rotor 2 and the stator 3 is implemented by means of an outer stator and an inner rotor. In this embodiment, the stator 3 includes a hollow portion 31, a plurality of gaps 32 and a plurality of windings (not shown in figures). The plurality of gaps 32 are connected with the hollow portion 31 respectively and disposed around the hollow portion 31 discretely and symmetrically. Each gap 32 is used to dispose a corresponding winding of the plurality of windings. The rotor 2 is disposed within the hollow portion 31 of the stator 3. Preferably but not exclusively, the rotor 2 is formed by stacking a plurality of silicon steel sheets. The rotor 2 includes a main body 4, a plurality of magnets 5 and a plurality of magnet-receiving slots 6.

The main body 4 includes a central axis C. The central axis C is located in center of the rotor 2. The rotor 2 is rotated around the central axis C by the magnetic force generated between the stator 3 and the rotor 2, and the central axis C is also the essential center (or geometric center) of the motor 1. For example, each magnet 5 is a permanent magnet which is an elongated column, but the preset invention is not limited thereto. The plurality of magnet-receiving slots 6 are disposed on the main body 4 and disposed around the central axis C symmetrically. Each magnet-receiving slot 6 is used to contain the corresponding magnet 5. In this embodiment, preferably but not exclusively, the number of the plurality of magnet-receiving slots 6 is equal to the number of the plurality of magnets 5. The number of the plurality of magnet-receiving slots 6 is 2N, wherein N is an integer and N is greater than or equal to 3. Consequently, the rotor 2 can be designed to provide 2N poles, which are not redundantly described hereafter.

In this embodiment, the number of the plurality of magnet-receiving slots 6 is twelve shown as FIG. 1. The twelve magnet-receiving slots 6 are disposed around the central axis C symmetrically, and the magnet-receiving slots 6 are arranged as hexagram shape. Two sides of each corner of the hexagram shape are formed by two magnet-receiving slots 6 which are adjacent and symmetrical to each other. The two magnet-receiving slots 6 which are adjacent and symmetrical to each other and belong to two adjacent corners of the hexagram shape arrangement are defined as a magnet-receiving slot pair. In this embodiment, the twelve magnet-receiving slots 6 forms six magnet-receiving slot pairs. For ease of description and easy to understand, the two magnet-receiving slots 6 of each magnet-receiving slot pair are called as a first magnet-receiving slot 6a and a second magnet-receiving slot 6b (marked as dashed frame in FIG. 1). The magnet-receiving slots 6 of the other magnet-receiving slot pairs are similar to the first magnet-receiving slot 6a and the second magnet-receiving slot 6b, and are not redundantly described hereafter. As shown in FIG. 1, the first magnet-receiving slot 6a and the second magnet-receiving slot 6b are located in two opposite sides of a perpendicular line Z which is perpendicular to the central axis C. The first magnet-receiving slot 6a and the second magnet-receiving slot 6b are adjacent and symmetrical to each other with respect to the perpendicular line Z of the central axis C. In this embodiment, the first magnet-receiving slot 6a and the second magnet-receiving slot 6b are adjacent to the perpendicular line Z and are located in two opposite sides of the perpendicular line Z symmetrically. The two magnet-receiving slots 6 of the other magnet-receiving slot pair are adjacent to a corresponding perpendicular line of the central axis C and are located in two opposite sides of the corresponding perpendicular line symmetrically, which are not redundantly described hereafter.

Please refer to FIGS. 1, 2A and 2B again. Each magnet-receiving slot 6 includes a slot body 61, a first flux barrier 62 and a second flux barrier 63. The distance between the first flux barrier 62 and the central axis C is defined as a first distance. The distance between the second flux barrier 63 and the central axis C is defined as a second distance. The second distance is greater than the first distance. Two ends of the slot body 61 are connected with the first flux barrier 62 and the second flux barrier 63 respectively. As a result, the slot body 61 is connected between the first flux barrier 62 and the second flux barrier 63. Portion of the second flux barrier 63 and the slot body 61 are used to contain the corresponding magnet 5. The first flux barrier 62 of the first magnet-receiving slot 6a is adjacent and symmetrical to the first flux barrier 62 of the corresponding second magnet-receiving slot 6b. The main body 4 includes a rib 64. The rib 64 is defined by and located between the first flux barrier 62 of the first magnet-receiving slot 6a and the first flux barrier 62 of the second magnet-receiving slot 6b which are adjacent and symmetrical to each other. The rib 64 has a stress concentration factor Kt. The stress concentration factor Kt is related to the structural strength, and details are described hereafter.

As shown in FIGS. 2A and 2B, a simulation circle O1 is simulated and created according to a curved angle (i.e. central angle) of a first arc length L1, wherein the curved angle of the first arc length L1 and the curved angle of an arc length of the simulation circle O1 corresponding to the first arc length L1 are equal. The simulation circle O1 is shown by a dotted circle in the left side of FIG. 2B. The radius of the simulation circle O1 is defined as a first arc length radius R1 of the first arc length L1. The first arc length radius R1 defines the structure of the first flux barrier 62. In details, while the rotor 2 is machined, the first flux barrier 62 is cut from an arc-cutting start point M1 to a first arc-cutting end point M2 along an arc with the first arc length radius R1, wherein the first arc-cutting end point M2 is defined when the first flux barrier 62 is cut to being proper shape. The route between the arc-cutting start point M1 and the first arc-cutting end point M2 is defined as the first arc length L1. In this embodiment, each first flux barrier 62 has similar structure, so each first flux barrier 62 includes an arc-cutting start point M1, a first arc-cutting end point M2 and a first arc length L1. A minimum arc-cutting distance d1 is formed between the arc-cutting start point M1 of each first flux barrier 62 and the arc-cutting start point M1 of the other first flux barrier 62 which are adjacent and symmetrical to each other. The minimum arc-cutting distance d1 is the minimum width of the rib 64. The minimum arc-cutting distance d1 is the shortest distance between the first flux barrier 62 of the first magnet-receiving slot 6a and the first flux barrier 62 of the second magnet-receiving slot 6b which are adjacent and symmetrical to each other. That is, the minimum arc-cutting distance d1 is the shortest distance between the first magnet-receiving slot 6a and the second magnet-receiving slot 6b which are adjacent and symmetrical to each other. A distance between the first arc-cutting end point M2 and the central axis C is less than a distance between the arc-cutting start point M1 and the central axis C. The first arc length L1 is located between the arc-cutting start point M1 and the first arc-cutting end point M2. The first arc length L1 is extended from the corresponding arc-cutting start point M1 toward the central axis C with arc-shaped.

Figure 3:
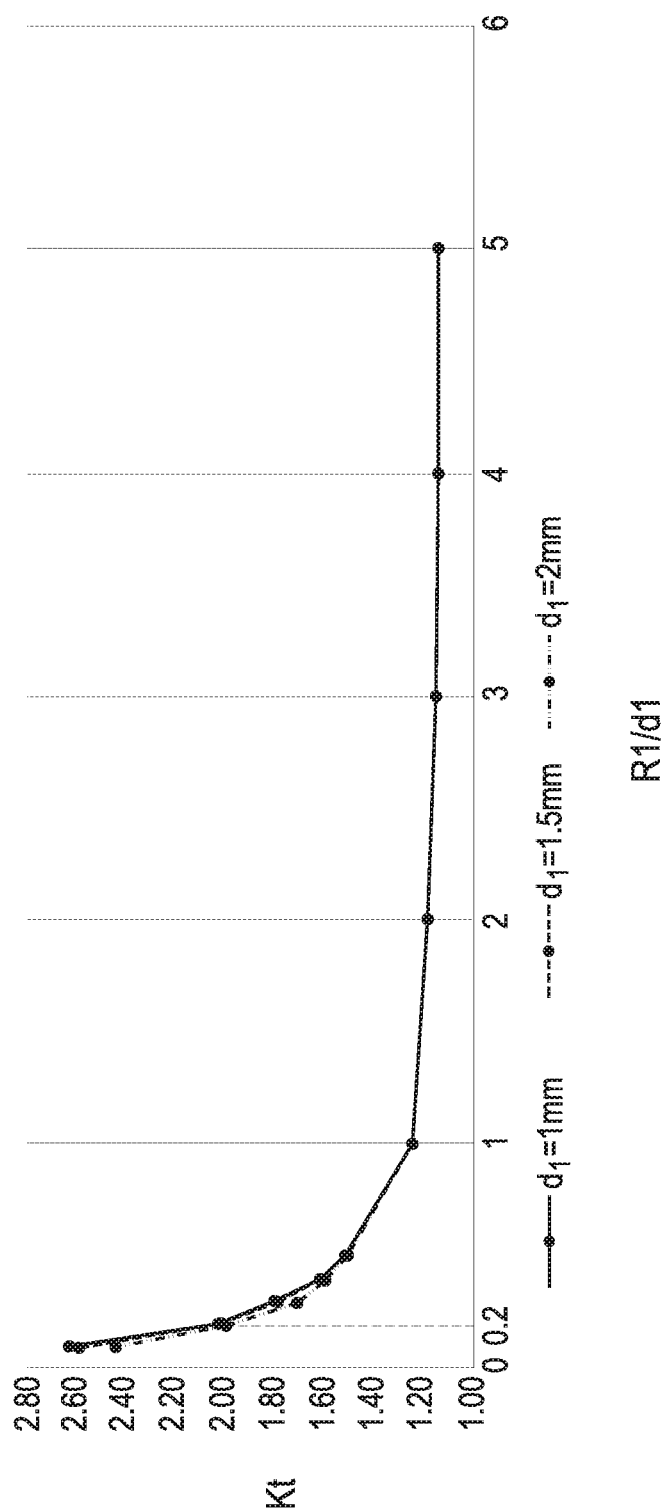
FIG. 3 is a curve diagram illustrating a comparison value corresponding to a stress concentration factor when a rib has different minimum arc-cutting distances, wherein the comparison value is the value of dividing a first arc length radius by the minimum arc-cutting distance.

Please refer to Table 1 and FIG. 3. Table 1 is a comparison table illustrating a stress concentration factor corresponding to different minimum arc-cutting distances of the rib structure and a comparison value, wherein the comparison value is the value of dividing a first arc length radius by the minimum arc-cutting distance. FIG. 3 is a curve diagram illustrating a comparison value corresponding to a stress concentration factor when a rib has different minimum arc-cutting distances, wherein the comparison value is the value of dividing a first arc length radius by the minimum arc-cutting distance. As shown in table 1, the value of dividing the first arc length radius R1 by the minimum arc-cutting distance d1 can be called the comparison value. Table 1 shows the comparison table of the corresponding stress concentration factor Kt when the comparison value and the minimum arc-cutting distance d1 are different. For example, when the comparison value is 0.1 (i.e. the value of dividing the first arc length radius R1 by the minimum arc-cutting distance d1 is 0.1) and the minimum arc-cutting distance d1 is 1 mm, the stress concentration factor Kt is 2.49, and so on. As shown in FIG. 3, the stress concentration factors Kt of the rib 64 and the comparison values have a negative correlation, wherein the rib 64 is located between the first flux barrier 62 of the first magnet-receiving slot 6a and the first flux barrier 62 of the second magnet-receiving slot 6b which are adjacent and symmetrical to each other, and the comparison value is the value of dividing the first arc length radius R1 by the minimum arc-cutting distance d1. When the value of dividing the first arc length radius R1 by the minimum arc-cutting distance d1 is larger, the stress concentration factor Kt is lower. That is, the lower stress concentration factor Kt represents that the efficacy of stress concentration in the rib 64 between the first flux barrier 62 of the first magnet-receiving slot 6a and the first flux barrier 62 of the second magnet-receiving slot 6b which are adjacent and symmetrical to each other is lower, so the structural strength of the rotor 2 is larger. On the contrary, when the value of dividing the first arc length radius R1 by the minimum arc-cutting distance d1 is lower, the stress concentration factor Kt is larger. That is, the larger stress concentration factor Kt represents that the efficacy of stress concentration in the rib 64 between the first flux barrier 62 of the first magnet-receiving slot 6a and the first flux barrier 62 of the second magnet-receiving slot 6b which are adjacent and symmetrical to each other is larger, so the structural strength of the rotor 2 is lower. For enhancing the structural strength of the rotor 2, the stress concentration factors Kt should be decreased. Consequently, the comparison value which is the value of dividing the first arc length radius R1 by the minimum arc-cutting distance d1 should be increased. In this embodiment, as shown in FIG. 3, when the first arc length radius R1 is greater than or equal to 0.2 times of the minimum arc-cutting distance d1, the stress concentration factors Kt is decreased effectively, and the stress concentration factors Kt convergences and approaches to 1 gradually. Consequently, in this embodiment, the first arc length radius R1 is greater than or equal to 0.2 times of the minimum arc-cutting distance d1.

of the first flux barrier 62 of each magnet-receiving slot 6 has the first arc length radius R1. The minimum arc-cutting distance d1 is formed between two magnet-receiving slots 6 which are adjacent and symmetrical to each other. The first arc length radius R1 is greater than or equal to 0.2 times of the minimum arc-cutting distance d1. Consequently, the value of dividing the first arc length radius R1 by the minimum arc-cutting distance d1 is larger, and the stress concentration factor Kt is decreased. The structural strength of the rotor 2 of the present disclosure is enhanced. Moreover, the first arc length radius R1 of the rotor 2 is greater than or equal to 0.2 times of the minimum arc-cutting distance d1, and the structural strength of the rotor 2 is enhanced. Therefore, the value of dividing the first arc length radius R1 by the minimum arc-cutting distance d1 is greater than or equal to 0.2, and the structural strength of the rotor 2 is enhanced. Moreover, when the value of dividing the first arc length radius R1 by the minimum arc-cutting distance d1 is larger, the structural strength of the rotor 2 is higher. Consequently, under the identical design requirements of the structural strength, when the first arc length radius R1 is increased, the minimum arc-cutting distance d1 is decreased moderately and accordingly. Therefore, the width of the rib 64 can be decreased so that the width of the rib 64 of the rotor 2 does not be increased endlessly. Consequently, the structural strength of the rotor 2 of the present disclosure is enhanced, and the magnetic loop characteristic and the efficacy of the motor 1 using the rotor 2 are enhanced. The whole characteristic of the motor 1 using the rotor 2 is optimized.

In some embodiments, for decreasing the efficacy of stress concentration in the rib 64 between the first arc-cutting end point M2 of the first flux barrier 62 of the first magnet-receiving slot 6a and the first arc-cutting end point M2 of the first flux bather 62 of the second magnet-receiving slot 6b which are adjacent and symmetrical to each other, an arc-cutting end point distance d2 is formed between the first arc-cutting end point M2 of the first flux barrier 62 of the first magnet-receiving slot 6a and the first arc-cutting end point M2 of the first flux barrier 62 of the second magnet-receiving slot 6b which are adjacent and symmetrical to each other. The arc-cutting end point distance d2 is greater than or equal to 1.2 times of the minimum arc-cutting distance d1.

As shown in FIGS. 2A and 2B, a simulation circle O2 is simulated and created according to a curved angle (i.e. central angle) of a second arc length L2, wherein the curved angle of the second arc length L2 and the curved angle of an arc length of the simulation circle O2 corresponding to the second arc length L2 are equal. The simulation circle O2 is shown by a dotted circle in the right side of FIG. 2B. The

|  | R1/d1 | | | | | | | | | |
| d1(mm) | 0.1 | 0.2 | 0.3 | 0.4 | 0.5 | 1 | 2 | 3 | 4 | 5 |
| --- | --- | --- | --- | --- | --- | --- | --- | --- | --- | --- |
| 1 | 2.49 | 1.98 | 1.71 | 1.57 | 1.47 | 1.24 | 1.12 | 1.09 | 1.07 | 1.05 |
| 1.5 | 2.59 | 2.01 | 1.75 | 1.59 | 1.49 | 1.24 | 1.14 | 1.09 | 1.07 | 1.06 |
| 2 | 2.66 | 2.04 | 1.77 | 1.61 | 1.50 | 1.24 | 1.12 | 1.09 | 1.07 | 1.06 |

Table 1 is a comparison table illustrating a stress concentration factor corresponding to different minimum arc-cutting distances of the rib structure and a comparison value, wherein the comparison value is the value of dividing a first arc length radius by the minimum arc-cutting distance.

From above, the rotor 2 of the present disclosure includes the plurality of the magnet-receiving slots 6. An arc length radius of the simulation circle O2 is defined as a second arc length radius R2 of the second arc length L2. The second arc length radius R2 defines the structure of the first flux barrier 62. In details, while the rotor 2 is machined, the first flux barrier 62 is cut from the first arc-cutting end point M2 to a second arc-cutting end point M3 along an arc with the second arc length radius R2, wherein the second arc-cutting end point M3 is defined when the first flux barrier 62 is cut to being proper shape. The route between the first arc-cutting end point M2 and the second arc-cutting end point M3 is defined as the second arc length L2. In some embodiment, each first flux barrier 62 includes a second arc-cutting end point M3 and a second arc length L2, which are similar to the second arc-cutting end point M3 and the second arc length L2 of the above first flux barrier 62. A distance between the second arc-cutting end point M3 and the central axis C is greater than a distance between the first arc-cutting end point M2 and the central axis Cl. The second arc length L2 is located between the first arc-cutting end point M2 and the second arc-cutting end point M3. The second arc length L2 is extended from the corresponding first arc-cutting end point M2 toward the slot body 61 with arc-shaped. In an embodiment, the value of the second arc length radius R2 is not limited, but the value of the second arc length radius R2 must implement the stress concentration in the rib 64 between the first arc-cutting end point M2 of the first flux barrier 62 of the first magnet-receiving slot 6a and the first arc-cutting end point M2 of the first flux barrier 62 of the second magnet-receiving slot 6b which are adjacent and symmetrical to each other is less than the stress concentration in the rib 64 between the arc-cutting start point M1 of the first flux barrier 62 of the first magnet-receiving slot 6a and the arc-cutting start point M1 of the first flux barrier 62 of the second magnet-receiving slot 6b which are adjacent and symmetrical to each other. That is, the stress concentration in the rib 64 between the two first arc-cutting end points M2 which are adjacent and symmetrical to each other is less than the stress concentration in the rib 64 between the two arc-cutting start points M1 which are adjacent and symmetrical to each other.

Please refer to FIG. 2A, in some embodiments, the main body 4 includes a plurality of structure-reinforcing portions 41. Each structure-reinforcing portion 41 is corresponding to the magnet-receiving slot 6. The structure-reinforcing portion 41 is located between the slot body 61 and the first flux barrier 62. One side of the structure-reinforcing portion 41 is defined as a first side wall 411 which is attached with the slot body 61. The other two sides of the structure-reinforcing portion 41 are defined as a second side wall 412 and a third side wall 413, which are attached with the first flux barrier 62, respectively. The second side wall 412 is connected with the first side wall 411 and perpendicular to the first side wall 411. Moreover, the length of the second side wall 412 defines the width of the structure-reinforcing portion 41 of the main body 4. The length of the second side wall 412 is equal to the width of the structure-reinforcing portion 41 of the main body 4. Preferably but not exclusively, the length of the second side wall 412 is greater than or equal to 1 mm. Consequently, stamping restriction of the magnet-receiving slot 6 is conformed. One end of the third side wall 413 is connected with the second side wall 412. The other end of the third side wall 413 is connected with the second arc-cutting end point M3. The third side wall 413 is parallel to the first side wall 411. The third side wall 413 is perpendicular to the second side wall 412.

In some embodiments, the minimum arc-cutting distance d1 is 1.7 mm. The arc-cutting end point distance d2 is 2.4 mm. The first arc length radius R1 is 10 mm. The second arc length radius R2 is 1 mm. The length of the second side wall 412 is 1.3 mm. Consequently, the rotor 2 of the present disclosure is achieved. The motor kinetic energy of the motor 1 using the rotor 2 of the present disclosure is 6.1 Vrms/krpm. The output torque of the motor 1 is 43.7 Nm. The maximum stress of the motor 1 is 350 MPa. Comparing with the conventional motor, the characteristic value of the motor 1 of the present disclosure is improved.

From the above descriptions, the rotor of the present disclosure includes a plurality of the magnet-receiving slots. An arc length of the first flux barrier of each magnet-receiving slot has a first arc length radius. A minimum arc-cutting distance is formed between two magnet receiving slots which are adjacent and symmetrical to each other. The first arc length radius is greater than or equal to 0.2 times of the minimum arc-cutting distance. Consequently, the value of dividing the first arc length radius by the minimum arc-cutting distance is larger, and the stress concentration factor is decreased. The structural strength of the rotor of the present disclosure is enhanced. Moreover, the first arc length radius of the rotor is greater than or equal to 0.2 times of the minimum arc-cutting distance, and the structural strength of the rotor is enhanced. That is, the value of dividing the first arc length radius by the minimum arc-cutting distance is greater than or equal to 0.2, and the structural strength of the rotor is enhanced. Moreover, when the value of dividing the first arc length radius by the minimum arc-cutting distance is larger, the structural strength of the rotor is higher. Consequently, when the structural strength of the rotor is maintained and the first arc length radius is increased, the minimum arc-cutting distance is decreased moderately and accordingly. Therefore, the width of the rib can be decreased. The width of the rib of the rotor could not be increased endlessly. Consequently, the structural strength of the rotor of the present disclosure is enhanced, and the magnetic loop characteristic and the efficacy of the motor using the rotor are enhanced. The whole characteristic of the motor using the rotor is optimized.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A rotor of a motor, wherein the rotor is matched with a stator of the motor, and wherein the rotor comprises:
 a main body comprising a central axis;
 a plurality of magnets; and
 a plurality of magnet-receiving slots, disposed on the main body and disposed around the central axis, wherein each two adjacent magnet-receiving slots of the plurality of magnet-receiving slots are symmetrical to each other, and each of the plurality of magnet-receiving slots comprises a slot body and a first flux barrier, wherein the slot body is connected with the first flux barrier for containing the corresponding magnet therein;
 wherein, in each two of the plurality of magnet-receiving slots which are adjacent and symmetrical to each other, each first flux barrier of each two of the plurality of magnet-receiving slots comprises a respective arc-cutting start point, and a minimum arc-cutting distance is formed between the two respective arc-cutting start points;
 wherein each of the two respective arc-cutting start points is extended toward the central axis along an arc with a first arc length radius to define a first arc-cutting end point, wherein the first arc length radius is greater than or equal to 0.2 times of the minimum arc-cutting distance.

2. The rotor according to claim 1, wherein an arc-cutting end point distance is formed between the two first arc-cutting end points of the two first flux barriers of the two magnet-receiving slots which are adjacent and symmetrical to each other, and the arc-cutting end point distance is greater than or equal to 1.2 times of the minimum arc-cutting distance.

3. The rotor according to claim 1, wherein the first arc-cutting end point is extended toward the slot body along an arc with a second arc length radius to define a second arc-cutting end point.

4. The rotor according to claim 1, wherein the main body comprises a plurality of structure-reinforcing portions, and each of the plurality of structure-reinforcing portions is located between the slot body and the first flux barrier of the corresponding magnet-receiving slot, wherein one side of each of the plurality of structure-reinforcing portions is defined as a first side wall to be attached with the slot body, the other side of each of the plurality of structure-reinforcing portions is defined as a second side wall to be attached with the first flux barrier, the second side wall is connected with the first side wall and perpendicular to the first side wall, a length of the second side wall defines a width of each of the plurality of structure-reinforcing portions, and the width of each of the plurality of structure-reinforcing portions is greater than or equal to 1 mm.

5. The rotor according to claim 1, wherein the rotor has a stress concentration factor, the stress concentration factor and a comparison value have a negative correlation, wherein the comparison value is defined as the value of dividing the first arc length radius by the minimum arc-cutting distance.

6. The rotor according to claim 1, wherein each of the plurality of magnet-receiving slots comprises a second flux barrier, and the first flux barrier and the second flux barrier are connected with two opposite ends of the slot body, respectively.

7. The rotor according to claim 6, wherein a first distance is formed between the first flux barrier and the central axis, and a second distance is formed between the second flux barrier and the central axis, wherein the second distance is greater than the first distance.

* * * * *